(12) United States Patent
Koehne (10) Patent No.: US 12,367,989 B2
(45) Date of Patent: Jul. 22, 2025

(54) METHOD FOR PRODUCING AN ELECTRICALLY CONDUCTIVE CONDUCTOR STRAND HAVING AT LEAST ONE CARBON CONDUCTOR

(71) Applicant: Robert Bosch GmbH, Stuttgart (DE)

(72) Inventor: Martin Koehne, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/257,016

(22) PCT Filed: Dec. 2, 2021

(86) PCT No.: PCT/EP2021/083890
§ 371 (c)(1),
(2) Date: Jun. 12, 2023

(87) PCT Pub. No.: WO2022/128495
PCT Pub. Date: Jun. 23, 2022

(65) Prior Publication Data
US 2024/0047097 A1    Feb. 8, 2024

(30) Foreign Application Priority Data

Dec. 15, 2020  (DE) .................... 10 2020 215 865.7
Mar. 11, 2021  (DE) .................... 10 2021 202 368.1
Jul. 23, 2021  (DE) .................... 10 2021 207 914.8

(51) Int. Cl.
*B82Y 40/00*     (2011.01)
*C01B 32/174*    (2017.01)
*H01B 1/04*      (2006.01)

(52) U.S. Cl.
CPC ............... *H01B 1/04* (2013.01); *B82Y 40/00* (2013.01); *C01B 32/174* (2017.08)

(58) Field of Classification Search
CPC .......... H01B 1/04; H01B 1/24; C01B 32/174; B82Y 40/00
(Continued)

(56) References Cited

U.S. PATENT DOCUMENTS 3,962,133 A     6/1976 Rodewald
4,388,227 A *   6/1983 Kalnin ................. H01B 1/04
                                                556/42
(Continued)

FOREIGN PATENT DOCUMENTS

CN     106410210 A     2/2017
CN     106744888 A     5/2017
(Continued)

OTHER PUBLICATIONS

Translation of JPH01-176210A from IP.com (Year: 1989).*
(Continued)

*Primary Examiner* — Tri V Nguyen
(74) *Attorney, Agent, or Firm* — Michael Best & Friedrich LLP (57) ABSTRACT

The invention relates to a method for producing an electrically conductive conductor strand (1) which comprises at least one carbon conductor (3), having the steps of:
  a) producing or providing a conductor strand (1) as an intermediate product comprising at least one carbon conductor (3), which comprises in particular graphite, pyrolytic graphite, graphene, graphin, and/or carbon nanotubes,
  b) introducing the conductor strand (1) and one or more intercalating substances (2), in particular either one or more metal halides or one or more organoalkali metals, into a gas phase or liquid phase of a reactor volume (5), the intercalating substance being suitable for intercalation into the material of the at least one carbon conductor (3) of the conductor strand (1), and
(Continued)

c) carrying out a thermal treatment of the conductor strand (1), in which the reactor volume (5) is brought to a process temperature to initiate an intercalation (4), in which atoms or molecules of the intercalating substance (2) are embedded in the material of the respective carbon conductor (3), in particular are accumulated on a carbon structure of the carbon conductor (3), in particular in the region between the layers of a multilayered carbon structure.

12 Claims, 3 Drawing Sheets

(58) Field of Classification Search
USPC .......................................................... 252/506
See application file for complete search history.

(56) References Cited

U.S. PATENT DOCUMENTS

| | | | |
|---|---|---|---|
| 4,477,374 | A | 10/1984 | Watanabe et al. |
| 4,885,120 | A | 12/1989 | McQuillan et al. |
| 2010/0206363 | A1 | 8/2010 | Choi |
| 2013/0180581 | A1 | 7/2013 | Choi |
| 2016/0019995 | A1 | 1/2016 | Zhamu et al. |
| 2019/0345647 | A1* | 11/2019 | Zhamu ..................... D01F 9/12 |

FOREIGN PATENT DOCUMENTS

| | | |
|---|---|---|
| CN | 107634224 A | 1/2018 |
| DE | 2537272 A1 | 3/1976 |
| DE | 2946414 A1 | 5/1981 |
| DE | 102019220177 A1 | 6/2021 |
| EP | 0212940 A2 | 3/1987 |
| EP | 0081004 B1 | 7/1987 |
| JP | S5860607 A | 4/1983 |
| JP | S59179816 A | 10/1984 |
| JP | S61119716 A | 6/1986 |
| JP | H01176210 A | 7/1989 |
| JP | 2006091381 A | 4/2006 |
| JP | 2013001588 A | 1/2013 |
| JP | 2016108215 A | 6/2016 |
| WO | 2021004692 A1 | 1/2021 |

OTHER PUBLICATIONS

Translation of International Search Report for Application No. PCT/EP2021/083890 dated Mar. 18, 2022 (3 pages).
Matsumoto et al., "Expansion of Tetrachloroaluminate-Graphite Intercalation Compound by Reaction with Anhydrous Hydrogen Fluoride," Carbon, 2014, vol. 67, 20 pages.
Nakajima et al., "Ternary Intercalation Compound of Graphite with Aluminum Fluoride and Fluorine," Zeitschrift für Naturforschung B, 1981, 36(11), pp. 1419-1423.

* cited by examiner

METHOD FOR PRODUCING AN ELECTRICALLY CONDUCTIVE CONDUCTOR STRAND HAVING AT LEAST ONE CARBON CONDUCTOR

BACKGROUND

The present invention relates to a method for producing an electrically conductive conductor strand having at least one carbon conductor.

Carbon conductors are known in the prior art. For example, the prior art knows electrical conductors made of graphite, pyrolytic graphite, carbon nanotubes, or graphene. In order to increase its electrical conductivity, it is known to dope the carbon conductor. For example, it is known from DE102019220177 A1 that graphene can be doped by intrinsically doped graphene. In WO2021004692 A1, it is shown how graphene can be doped by oxides into transitional metals in order to increase electrical conductivity. EP0081004 B1 shows that the electrical conductivity of graphite can be increased by doping with $BF_3$, $SiF_4$, $HfF_4$, $TiF_4$, $ZrF_4$, $PF_5$, $NbF_5$, $TaF_5$, $AsF_5$, or $SbF_5$.

From CN106744888A, it is known to produce graphene in a graphene dispersion by adding aluminum fluoride and amines. From Nakajima, T., Kawaguchi, M., & Watanabe, N. (1981). Ternary intercalation composite of graphite with aluminum fluoride and fluorine. Zeitschrift für Naturforschung [Journal of Natural Research] B, 36(11), 1419-1423, it is also known that aluminum fluoride intercalates into graphite when equimolar fluorine is present in the gas phase and when sufficiently high temperatures are given. The disadvantage is that the intercalation requires high temperatures, which leads to the fluorine fluorinating the graphite at as low as 300° C., thus deteriorating the electrical conductivity.

EP0212940 shows that metal chlorides are then particularly well suited for intercalative doping when they have a low sublimation or boiling point. EP0212940 therefore utilizes aluminum chloride, which has a very low sublimation point, in order to intercalate other metal chlorides having a higher sublimation or boiling point more quickly and at lower temperatures into the graphite.

According to the prior art, it is also disadvantageous that, as described by Matsumoto et al. (Matsumoto, K., Minori, D., Takagi, K., & Hagiwara, R. (2014), Expansion of tetrachloroaluminate-graphite intercalation composite by reaction with anhydrous hydrogen fluoride. Carbon, 67, 434-439), a fluorination of graphite intercalated with metal chloride with anhydrous hydrofluoric acid (HF) results in gases forming in the graphite and thereby expanding the graphite. This would also analogously lead to the expansion of the conductor and thus to its destruction.

SUMMARY

By contrast, the method according to the invention has the advantage that a conductor strand can be produced with carbon conductors having a higher electrical conductivity than in the prior art and being temperature-resistant up to at least 200° C.

The method produces a final product according to a first embodiment and an intermediate product according to a second and third embodiment, which can be processed into a final product by further steps according to the invention.

According to a first embodiment, the intercalating substance is at least a metal fluoride, in particular an aluminum fluoride ($AlF_3$), zirconium fluoride ($ZrF_4$), iron fluoride ($FeF_3$), or magnesium fluoride ($MgF_2$), wherein the metal of the metal fluoride is selected from one of the groups 2, 4, 5, 6, 8, 10, 11, 12, or 13 of the periodic table. The method according to the first embodiment with the metal fluoride as the intercalating substance has the advantage that it requires few process steps and is thus very simple, because an intercalation of an intercalating substance or dopant occurs, which, as a strong Lewis acid in the conductor material of the conductor strand, directly leads to an increase in electrical conductivity.

According to a second embodiment, the intercalating substance is at least a metal chloride, metal bromide, or metal iodide, in particular an aluminum chloride ($AlCl_3$), aluminum bromide ($AlBr_3$), aluminum iodide ($AlI_3$), zirconium chloride ($ZrCl_4$), zirconium bromide ($ZrBr_4$), iron chloride ($FeCl_3$), magnesium chloride ($MgCl_2$), magnesium bromide ($MgBr_2$), or magnesium iodide ($MgI_2$), wherein the metal of the metal chloride, metal bromide, or metal iodide is selected from one of the groups 2, 4, 5, 6, 8, 10, 11, 12, or 13 of the periodic table. The method according to the second embodiment has the advantage that the intercalating substance can be intercalated into the conductor strand at lower temperatures than in the method according to the first embodiment.

According to a third embodiment, the intercalating substance is an organoalkali metal, in particular a sodium organyl, specifically in particular sodium naphthalide ($C_{10}H_8Na$), n-amyl sodium ($C_5H_{11}Na$), or benzyl sodium ($C_7H_7Na$), a potassium organyl, specifically in particular benzyl potassium ($C_7H_7K$) or methyl potassium ($CH_3K$), or a lithium organyl, specifically in particular benzyllithium ($C_7H_7Li$), n-hexyllithium ($C_6H_{13}Li$), n-butyllithium ($C_4H_9Li$), and phenyllithium ($C_6H_5Li$). The method according to the third embodiment has the advantage that the intercalating substance can be intercalated into the conductor strand at lower temperatures than in the method according to the first embodiment. In addition, the method according to the third embodiment does not require an auxiliary gas such as fluorine or chlorine for intercalation. Moreover, by contrast to the other embodiments, the third embodiment causes a doping of the n-type carbon conductor.

It is advantageous when the method according to the first embodiment comprises the step of adding gaseous fluorine as an auxiliary gas into the gas phase in case of an intercalation in the gas phase of the reactor volume or that a liquid phase is provided with fluorine ions in case of an intercalation in the liquid phase of the reactor volume. In this way, it is achieved that the intercalation is accelerated, because the intercalating substance can penetrate more quickly into the conductor material of the conductor strand.

In addition, it is advantageous when, in case of an intercalation in the gas phase of the reactor volume, the method according to the second embodiment comprises the step of adding gaseous chlorine, bromine, and/or iodine as an auxiliary gas to the reactor volume. In particular, in case of a metal chloride as the intercalating substance, chlorine is preferably added, in case of a metal bromide as the intercalating substance preferably bromine, or preferably iodine in case of a metal iodide as the intercalating substance. In this way, the intercalation is enabled and/or accelerated, because the intercalating substance intercalates only thereby or can intercalate more quickly into the conductor material of the conductor strand.

It is very advantageous when the method according to the second embodiment additionally comprises the step of converting the metal chloride, metal bromide, and/or metal iodide present in the material of the respective carbon conductor into metal fluoride by treating the conductor strand with a fluorinating agent. The method according to the second embodiment has the advantage over the first embodiment that the intercalating agent metal chloride, metal bromide, or metal iodide can be intercalated into the conductor strand at lower temperatures than the metal fluoride according to the first embodiment. By converting with the fluorinating agent, the intercalating substance, i.e. the metal chloride, metal bromide, or metal iodide, is converted subsequently into metal fluoride, and thus into a strong Lewis acid in situ, thereby achieving a high electrical conductivity in the carbon conductor of the conductor strand. Thus, the intercalated intercalating substance, by contrast to the method according to the first embodiment, does not directly cause a sharp increase in the electrical conductivity in the conductor material. This is only achieved subsequently by the in situ conversion of the intercalating substance by means of the fluorinating agent.

The fluorinating agent can in particular comprise $XeF_2$, $F_2$, a perfluorinated or fluorinated olefin, such as in particular hexafluorobutene or hexafluoropropene, chlorofluorocarbons (CFC) such as in particular trichlorofluoromethane, hydrofluorocarbons (HFC), such as in particular perfluorohexane, pentafluorobutane, or pentafluoropropane, and/or or can be present in particular in the gas phase or can transition into the gas phase during the fluorinating treatment. The treatment with the fluorinating agent is carried out in particular at a temperature of less than 200° C., thereby avoiding the formation of clusters by diffusion from the intercalated chloride, metal bromide, or metal iodide finely distributed in the carbon conductor, which would cause a deterioration of the electrical conductivity of the respective carbon conductor.

In addition, it is advantageous when the method according to the third embodiment additionally comprises the step of converting the organoalkali metal present in the carbon conductor into alkali metal hydride, in particular lithium hydride (LiH), sodium hydride (NaH), or potassium hydride (KH), by thermally treating the conductor strand in a hydrogen atmosphere, in particular at a temperature of 50° C.-250° C. The method according to the third embodiment has the advantage over the first embodiment that the organoalkali metal can be intercalated as an intercalating agent into the conductor strand at lower temperatures than the metal fluoride according to the first embodiment. The intercalation is carried out from a solvent in which the organoalkali metal is dissolved.

The reaction with hydrogen during a thermal treatment subsequently converts the intercalating substance, i.e. the organoalkali metal, into alkali metal hydride and thus into a strong Lewis base in situ, thereby achieving a high electrical conductivity in the carbon conductor of the conductor strand. Thus, by contrast to the method according to the first embodiment, the intercalated organoalkali metal as the intercalating substance does not directly cause an increase in the electrical conductivity in the conductor material. This is only achieved subsequently by the reaction of the intercalating substance with the hydrogen by means of the thermal treatment in the hydrogen atmosphere as an in situ conversion into the alkali metal hydride and an organic residue.

It is also advantageous when the method according to any one of the three embodiments additionally comprises the step of intercalating a hydrophobic substance, in particular aliphate, alkane such as in particular undecan, perfluorotripentylamine, perfluoroperhydrofluorene, perfluorophenanthrene, or polysiloxane such as in particular polymethyl siloxane, into the material of the respective carbon conductor, in particular in a gas phase or liquid phase. In this way, the penetration of water into the conductor strand is prevented, so that the conductor strand is insensitive to water in terms of its material properties, in particular the electrical conductivity and material resistance.

Moreover, it is advantageous when the method according to any one of the three embodiments additionally comprises the step of compressing the conductor strand in a volume-reducing manner, for example in order to at least partially revert a volume-increasing expansion of the conductor strand during the intercalation of the intercalating substance. In this way, the electrical conductivity of the conductor strand is further increased, because the porosity and thus the conductor cross-section is reduced, while the electrical conductor resistance remains unchanged.

In addition, the limp conductor strand can be arranged in grooves of an electric machine with a high groove fill factor, so that the power of the electric machine can be increased.

In case the intercalation is carried out in the gas phase of the reactor volume 5, water vapor can additionally be produced in the reactor volume 5 or added to the reactor volume 5 in the second step of the method. This has the advantage that a volume-increasing expansion of the conductor strand due to the intercalation of the intercalating substance is less than in the method without the addition of water vapor.

BRIEF DESCRIPTION OF THE DRAWINGS

Embodiment examples of the invention are described in detail hereinafter with reference to the accompanying drawings. The drawings show.

DETAILED DESCRIPTION

Figure 1:
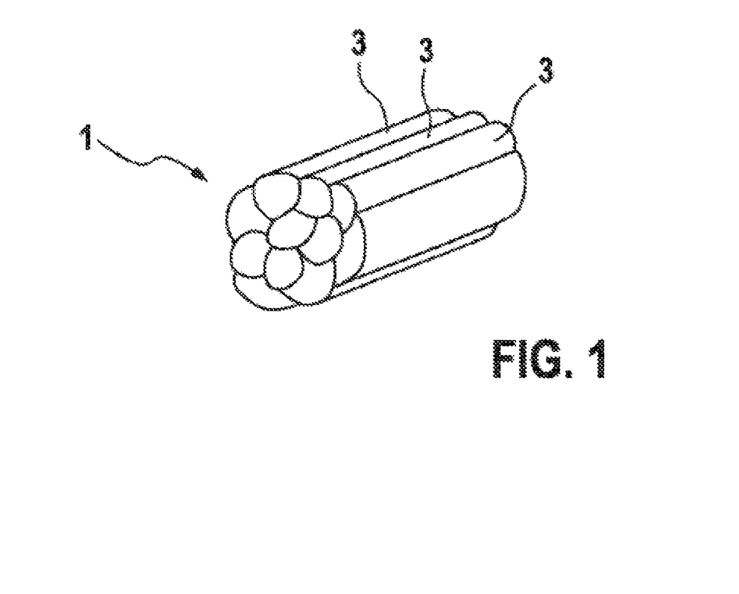
FIG. 1 a schematic illustration of a conductor strand that can be produced with a method according to an embodiment example of the invention, FIG. 2 a schematic cross-section through the conductor strand of FIG. 1, which is arranged in a reactor volume, FIG. 3 a schematic illustration of the intercalation during a heat treatment as part of the method according to an embodiment example of the invention, and FIG. 4 a schematic illustration of an in situ conversion according to the invention into metal fluorides or alkali metal hydrides.

FIG. 1 schematically shows a conductor strand 1 comprising at least one carbon conductor 3.

In a first step, at least one conductor strand 1 is provided or produced as an intermediate product for carrying out the method according to the invention.

This conductor strand 1 is a composite conductor, for example a yarn, which is constructed of a plurality of carbon conductors 3, for example, wherein the carbon conductor 3 can each be a conductor film, a filament, or a fiber. Alternatively, the carbon conductors 3 can also be yarns or composite conductors with smaller diameters than the conductor strand 1. The carbon conductors 3 are made from a carbon substance such as graphite, pyrolytic graphite, graphene, graphin, and/or carbon nanotubes, or from compounds based thereon, for example graphene oxide.

Figure 2:
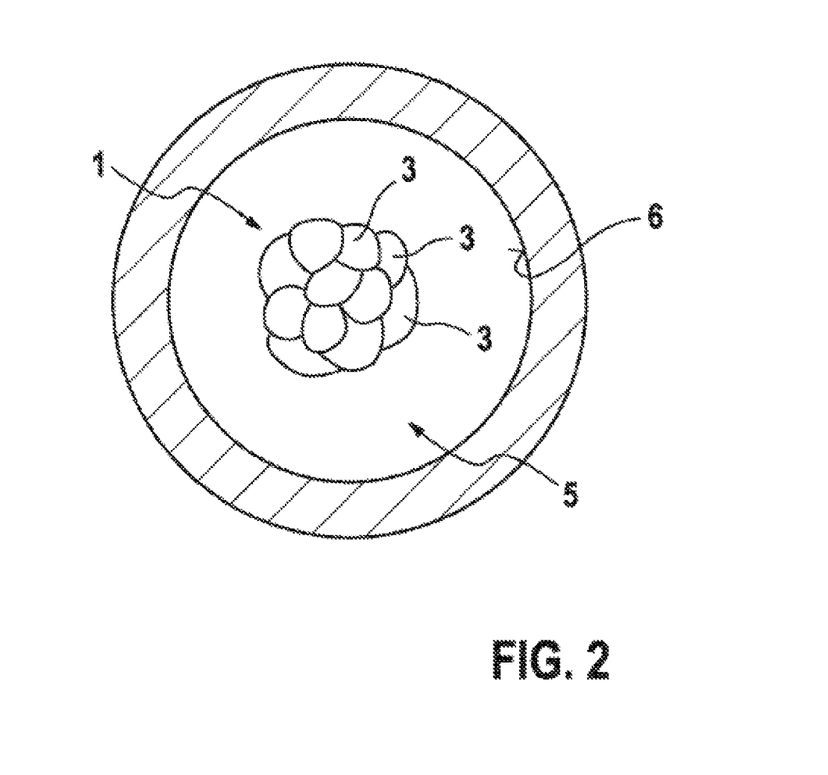

In a second step of the method, the conductor strand 1 is introduced together with one or more intercalating substances 2 into a gas phase or liquid phase of a reactor volume 5 (FIG. 2). The intercalating substance 2 is selected so as to be suitable for intercalation into the material of the at least one carbon conductor 3 of the conductor strand 1.

In a third step of the method, a thermal treatment of the conductor strand 1 is carried out, in which the reactor volume 5 is brought to a process temperature to initiate an intercalation 4, in which atoms or molecules of the intercalating substance 2 are embedded in the material of the respective carbon conductor 3, for example are accumulated on a carbon structure of the carbon conductor 3, e.g. in the region between the layers of a multi-layered carbon structure.

Figure 3:
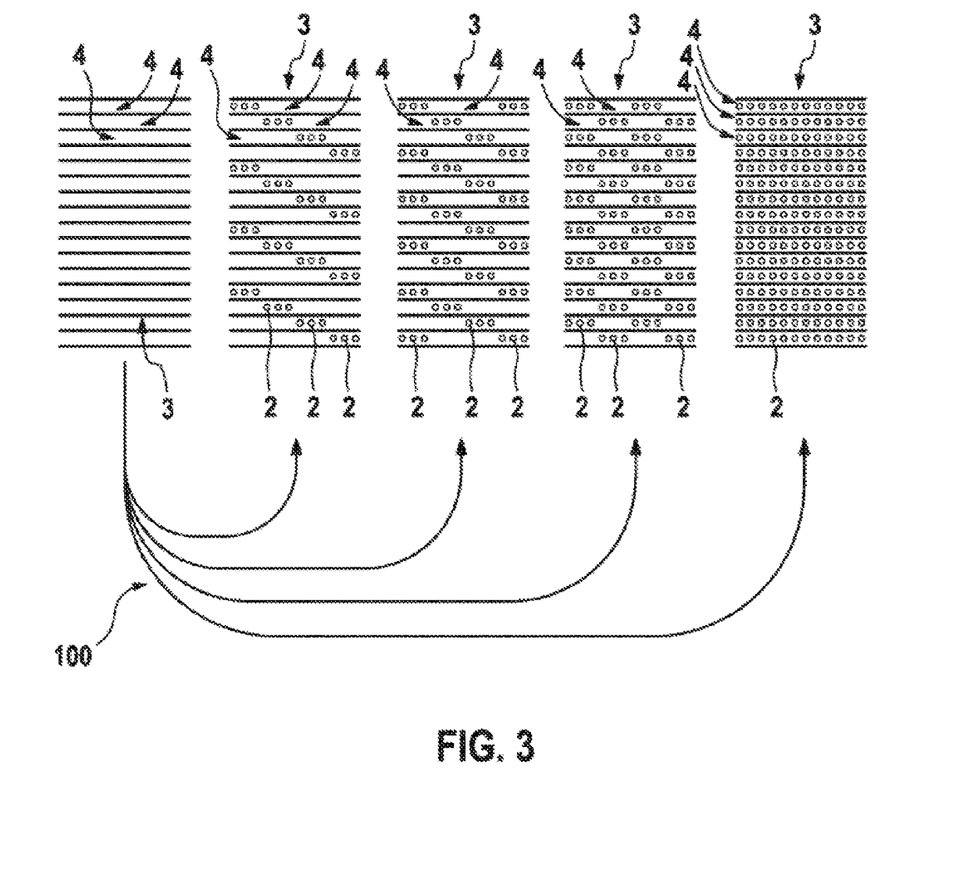

FIG. 3 schematically shows a principle sequence of the intercalation 100, wherein it is shown by way of example how the intercalating substance 2 intercalates into intermediate layers 4 of the carbon substance, being formed from graphene in the example, of the at least one carbon conductor 3 of the conductor strand 1. FIG. 3 shows various stages of intercalation 100 in which different amounts of the intercalating substance 2 are intercalated into the carbon material of the carbon conductor 3.

Various configurations are provided for the intercalating substances 2, which are described below as three different embodiments.

According to the present invention, the intercalating substances 2 can be one or more metal halides according to a first or second embodiment or one or more organoalkali metals according to a third embodiment.

First Embodiment: Use of Metal Fluoride, in Particular Aluminum ($AlF_3$)

In a first embodiment of the method according to the invention, it is provided that metal fluoride is used for the intercalative doping of the conductor strand 1, wherein the metal of the metal fluoride is selected from one of the groups 2, 4, 5, 6, 8, 10, 11, 12, or 13 of the periodic table. Examples of suitable metal fluorides are aluminum fluoride ($AlF_3$), zirconium fluoride ($ZrF_4$), iron fluoride ($FeF_3$), and magnesium fluoride ($MgF_2$). In particular, amorphous aluminum fluoride ($AlF_3$) is a very strong Lewis acid.

In case the intercalation is carried out in the gas phase of the reactor volume 5, gaseous fluorine can additionally be added as an auxiliary gas into the gas phase in the second step of the method. In case the intercalation is carried out in the liquid phase of the reactor volume 5, a liquid phase with fluorine ions can be selected.

A low vacuum in the reactor volume 5 can be provided for the intercalation. The reactor volume 5 is, for example, evacuated to a vacuum of preferably a maximum of 0.1 mbar and particularly preferably a maximum of 0.01 mbar. The walls of the reactor volume 5 are designed so as to be resistant to the intercalating substance 2 and are made of, for example, nickel or copper.

In the third step of the method, the reactor volume 5 is heated to a process temperature of at least 750° C. The process temperature lies near the sublimation temperature of the metal fluoride, for example above the sublimation temperature.

For example, the intercalation in the gas phase can be carried out such that the temperature around the limit point, at which sublimation begins, oscillates with a range of variation in particular from ±20° C. to ±40° C. As a result, the temperature oscillates between sublimation and resublimation of the intercalating substance. Thus, the intercalation occurs without cluster formation of metal fluoride crystals with more than 10 vol. % in the conductor material.

It is considered here that the pressure in the reactor volume 5 changes as a function of the temperature. Thus, the pressure at room temperature is selected such that the pressure allows for a sublimation of the metal fluoride upon reaching the target temperature. Preferably, it is contemplated that the intercalated aluminum fluoride is predominantly amorphous, because in this case there is the high strength as a Lewis acid.

The doping according to the first embodiment is stable in particular up to at least 300° C., wherein moisture does not have a decomposing effect on the doping. Thus, an effective and consistent doping is achieved.

Second Embodiment: Use of a Metal Chloride, Metal Bromide, or Metal Iodide and Subsequent in Situ Conversion into a Metal Fluoride In addition to the previously described first embodiment, in which metal fluoride is used as the intercalating substance 2, an alternative second embodiment of the method is provided in which at least one metal chloride, metal bromide, or metal iodide as the intercalating substance 2 intercalate into the carbon conductor 3, wherein the metal of the metal chloride, metal bromide or metal iodide is selected from one of the groups 2, 4, 5, 6, 8, 10, 11, 12, or 13 of the periodic system. An additional step is subsequently carried out, in which an in situ conversion 200 of the metal chloride, metal bromide, and/or metal iodide to the metal fluoride takes place by fluorination. This is shown schematically in FIG. 4.

Examples of suitable intercalating substances according to the second embodiment are aluminum chloride ($AlCl_3$), aluminum bromide ($AlBr_3$) or aluminum iodide ($AlI_3$), zirconium chloride ($ZrCl_4$), zirconium bromide ($ZrBr_4$), iron chloride ($FeCl_3$), magnesium chloride ($MgCl_2$), magnesium bromide ($MgBr_2$), and magnesium iodide ($MgI_2$).

In case the intercalation is carried out in the gas phase of reactor volume 5, gaseous chlorine, bromine, or iodine can additionally be added as an auxiliary gas into reactor volume 5 in the second step of the method. For example, in case of a metal chloride as the intercalating substance 2, chlorine can be added, in case of a metal bromide as the intercalating substance 2 bromine can be added, and in case of a metal iodide as the intercalating substance 2, iodine can be added.

In case the intercalation is carried out in the gas phase of the reactor volume 5, water vapor can additionally be produced in the reactor volume 5 or added to the reactor volume 5 in the second step of the method. In this way, it can be achieved that the volume increase of the conductor strand or the carbon conductor caused by the intercalation is lower than in the method, without addition of water vapor.

In a fourth step of the method according to the invention, the intercalated metal chloride, metal bromide, and/or metal iodide present in the material of the respective carbon conductor 3 is converted into metal fluoride in situ.

This is done by treating the conductor strand 1 with a fluorinating agent. For example, the fluorinating agent is selected from a group of substances comprising $XeF_2$, $F_2$, perfluorinated or fluorinated olefins, such as in particular hexafluorobutene or hexafluoropropene, chlorofluorocarbons (CFC) such as in particular trichlorofluoromethane, hydrofluorocarbons (HFC), such as in particular perfluorohexane, pentafluorobutane, or pentafluoropropane. The fluorinating agent is present in the gas phase in the fourth step or transitions into the gas phase in the fourth step. The treatment with the fluorinating agent is carried out, for example, at a temperature of less than 200° C.

The embodiment examples described below are possible for this purpose:

Use of Aluminum Chloride ($AlCl_3$), Aluminum Bromide ($AlBr_3$), or Aluminum Iodide ($AlI_3$)

In this embodiment example, in the fourth step, amorphous aluminum fluoride ($AlF_3$) is produced in situ in the composite conductor. In terms of its strength as a Lewis acid, the amorphous aluminum fluoride ($AlF_3$) is comparable to the strength of antimony fluoride ($SbF_5$) and arsenic fluoride ($AsF_3$).

In one embodiment example, the fluorination of aluminum chloride ($AlCl_3$) is provided, wherein, in the third step, the aluminum chloride ($AlCl_3$) is intercalated as the intercalating substance 2 in the at least one carbon conductor 3 of the conductor strand 1.

The advantage is that aluminum chloride ($AlCl_3$) intercalates very easily into a carbon conductor 3, because its sublimation temperature is very low at 1 bar at approximately 180° C. compared to $AlF_3$ at approximately 1260° C., and $AlCl_3$ is present in the gas phase as tetrahedrally coordinated dimers.

A further advantage is that, in the composite conductor, the in situ conversion of $AlCl_3$ into $AlF_3$ can occur by means of the fluorinating agent at room temperature. This results in amorphous $AlF_3$ having a high strength as a Lewis acid. Thus, the conductivity of the carbon conductor 3 can be increased. Because the $AlCl_3$ used is largely converted into $AlF_3$, the same advantages result as described above.

In the second step, the aluminum chloride ($AlCl_3$) and the conductor strand 1 are introduced into an enclosed reactor volume 5, wherein walls 6 of the reactor volume 5 are made of, for example, nickel or copper. The atmosphere in the reactor volume 5 is exchanged for an inert gas, in particular argon or helium. This is done in particular by repeated evacuation up to a pressure of less than 0.1 mbar and filling of the vacuum with an inert gas. Alternatively, the reactor volume 5 can also be rendered inert by a vacuum of preferably less than 0.1 mbar and particularly preferably less than 0.01 mbar. The vacuum increases the partial pressure of $AlCl_3$ and thereby facilitates the doping.

Then, in the third step, heat treatment is preferably carried out at 80° C.-250° C. The $AlCl_3$ intercalates into the conductor strand 1, i.e. the composite conductor, as shown schematically in FIG. 3. The duration of the heat treatment depends in particular on the thickness of the composite conductor and the diffusion path length for the $AlCl_3$ determined therefrom.

Figure 4:
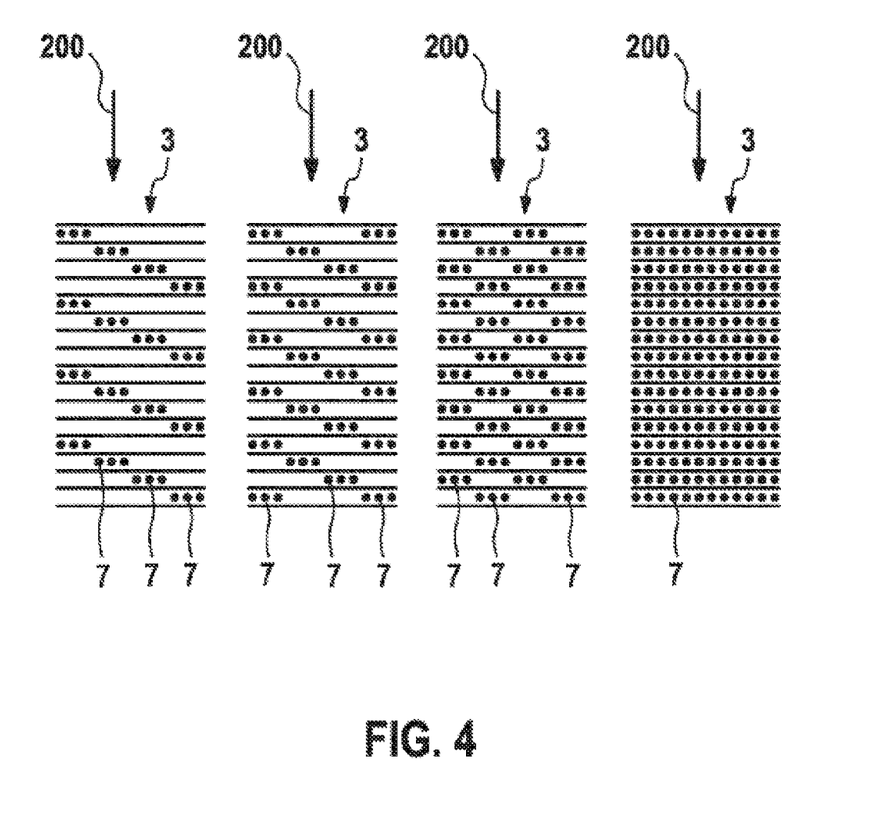

In the fourth step, a treatment with the fluorinating agent is carried out. In the fourth step, amorphous $AlF_3$ is produced in the conductor strand 1 in situ by fluorinating $AlCl_3$ intercalated in the conductor strand 1 by the fluorinating agent (FIG. 4), as exemplified below with fluorine as the fluorinating agent for converting aluminum chloride and fluorine into aluminum fluoride and chlorine:

$$2AlCl_3 + 3F_2 \rightarrow 2AlF_3 + 3Cl_2$$

The fluorination of the $AlCl_3$ is highly exothermic and can therefore occur at room temperature. Due to these very mild conditions during fluorination, the formed $AlF_3$ cannot crystallize and thus remains intercalated according to the invention amorphously and finely distributed, particularly advantageously monomolecularly, in the composite conductor. The monomolecularly finely distributed $AlF_3$ is a strong electron acceptor and causes a p-type doping for the carbon conductor. This allows a high electrical conductivity of the carbon conductor 3 to be achieved.

In this case, highly exothermic fluorination takes place according to a reaction of aluminum chloride and trichlorofluoromethane into aluminum fluoride and tetrachloromethane:

$$AlCl_3 + 3CFCl_3 \rightarrow AlF_3 + 3CCl_4$$

During the embedding in the $CFCl_3$, the $CCl_4$ formed in the composite conductor diffuses into the $CFCl_3$.

In the third step, as an alternative to aluminum chloride ($AlCl_3$) as the intercalating substance 2, aluminum bromide or aluminum iodide can be intercalated into the carbon conductor or composite conductor. In the third step, the conductor strand 1 is heat-treated, for example at 220° C.-360° C. The aluminum bromide and/or aluminum iodide intercalates into the composite conductor. The duration of the heat treatment depends in particular on the thickness of the composite conductor and the diffusion path length for the aluminum halides determined therefrom. The fluorination of aluminum bromide or aluminum iodide is highly exothermic and can therefore be carried out at room temperature, for example for aluminum bromide according to the following reaction:

$$AlBr_3 + 3CFCl_3 \rightarrow AlF_3 + 3CBrCl_3$$

In this reaction, aluminum bromide and trichlorofluoromethane react into aluminum fluoride and bromotrichloromethane.

With fluorine as the fluorinating agent and aluminum bromide as the intercalator, the following reaction occurs:

$$2AlBr_3 + 3F_2 \rightarrow 2AlF_3 + 3Br_2$$

In this reaction, aluminum bromide is converted into aluminum fluoride and bromine under the effect of fluorine.

Aluminum bromide or aluminum iodide intercalate very easily in the carbon conductor, because their boiling temperatures at 263° C. ($AlBr_3$) and 360° C. ($AlI_3$), respectively, are very low compared to the sublimation temperature of $AlF_3$ at approximately 1260° C.

One advantage of the embodiment example is that the doping with $AlF_3$ is stable in particular up to at least 300° C. and is not very sensitive to moisture. This corrects the defect that, according to the prior art, highly effective intercalative dopants are either volatile at elevated temperature and vaporize into the surrounding atmosphere or are decomposed by humidity upon contact with air, thereby rendering the doping ineffective.

Due to these very mild conditions during fluorination, the formed $AlF_3$ cannot crystallize and thus remains intercalated according to the invention amorphously and finely distributed in the composite conductor.

The composite conductor can thereafter be evacuated at 120° C., for example, in order to remove intercalated bromotrichloromethane (boiling point 105° C.) or $CCl_4$ (boiling point 76.7° C.) from the composite conductor, if necessary.

Use of Zirconium Chloride ($ZrCl_4$)

A further embodiment example is doping with zirconium fluoride ($ZrF_4$). Zirconium fluoride ($ZrF_4$) has the advantage that, if present amorphously, it is one of the strongest Lewis acids.

In the second step, the $ZrCl_4$ and the conductor strand 1 are introduced into the reactor volume 5, wherein walls 6 of the reactor volume 5 are made of, for example, nickel or copper. The atmosphere in the reactor volume 5 is exchanged for an inert gas, in particular argon or helium. Preferably, this is done by repeated evacuations up to a pressure of 0.1 mbar and the corresponding breakage of the vacuum with an inert gas. Alternatively, the reactor volume 5 can also be rendered inert by a vacuum of preferably less than 0.1 mbar and more preferably less than 0.01 mbar. The applied vacuum lowers the sublimation temperature and increases the partial pressure of $ZrCl_4$, thereby facilitating the doping. In addition, the addition of chlorine can accelerate the intercalation. This can be done, for example, by adding gold chloride ($AuCl_3$) or gold chloride monohydrate ($AuCl_3 \cdot H_2O$). Gold chloride monohydrate loses its crystalline water from 100° C. Both types of gold chloride decompose at 1 bar pressure from 254° C. and release chlorine in the process.

In the third step, heat treatment is preferably carried out at 290° C.-450° C. The $ZrCl_4$ intercalates into the composite conductor. The duration of the heat treatment depends in particular on the thickness of the composite conductor and the diffusion path length for the $ZrCl_4$ determined therefrom.

In the fourth step, a treatment with the fluorinating agent is carried out. This can be a perfluorinated or fluorinated olefin, such as in particular hexafluorobutene and hexafluoropropene, a hydrofluorocarbon (CFC) such as in particular trichlorofluoromethane $CFCl_3$ (boiling point 23.7° C.) or dichlorofluoromethane $CF_2Cl_2$, a hydrofluorocarbon (CHF), such as in particular perfluorohexane, pentafluorobutane, or pentafluoropropane, or another suitable fluorine composite, such as $XeF_2$ or $F_2$.

In the fourth step, amorphous zirconium fluoride ($ZrF_4$) is produced in the conductor strand 1 in situ by fluorinating zirconium chloride ($ZrCl_4$) intercalated in the conductor strand 1 by the fluorinating agent, as exemplified with fluorine as the fluorinating agent in the following reaction for converting zirconium chloride and fluorine into zirconium fluoride and chlorine:

$$ZrCl_4 + 2F_2 \rightarrow ZrF_4 + 2Cl_2$$

The fluorination of the $ZrCl_4$ is highly exothermic and can therefore occur at room temperature. Due to these very mild conditions during fluorination, the formed $ZrF_4$ cannot crystallize and thus remains intercalated according to the invention amorphously and finely distributed, particularly advantageously monomolecularly, in the composite conductor. This allows a high electrical conductivity of the carbon conductor 3 to be achieved.

In a further step, the composite conductor is embedded with liquid $CFCl_3$ so that the composite conductor is surrounded by gaseous $CFCl_3$ in a high concentration of >30% by vol. In this case, highly exothermic fluorination takes place according to a reaction of zirconium chloride and trichlorofluoromethane into zirconium fluoride and tetrachloromethane:

$$ZrCl_4 + 4CFCl_3 \rightarrow ZrF_4 + 4CCl_4$$

The composite conductor can thereafter be evacuated at 120° C., for example, in order to remove any traces of intercalated tetrachloromethane (boiling point 76.7° C.) from the composite conductor, if necessary, that are not diffused into the trichlorofluoromethane.

Use of Iron Chloride ($FeCl_3$)

Likewise, doping with iron fluoride ($FeF_3$) is possible, because iron fluoride ($FeF_3$), if present amorphously or monomolecularly, is a strong Lewis acid. For this purpose, iron chloride ($FeCl_3$) is used as the intercalating substance 2.

In the second step, the iron chloride ($FeCl_3$) and the conductor strand are introduced into the reactor volume 5, wherein the walls 6 of the reactor volume 5 are preferably made of nickel or copper. The atmosphere in the reactor volume 5 is exchanged for an inert gas, in particular argon or helium. This is preferably done by repeated evacuation up to a pressure of less than 0.1 mbar and corresponding filling of the vacuum with an inert gas. Alternatively, the reactor volume 5 can also be rendered inert by a vacuum of preferably less than 0.1 mbar and particularly preferably less than 0.01 mbar. The vacuum increases the volatility of $FeCl_3$ and thereby facilitates the doping. In addition, the addition of chlorine can accelerate the intercalation. This is done, for example, by adding gold chloride ($AuCl_3$) or gold chloride monohydrate ($AuCl_3 \cdot H_2O$). Gold chloride monohydrate loses its crystalline water from 100° C. Both types of gold chloride decompose at 1 bar from 254° C. and at 0.1 mbar already from 65° C. under chlorine debonding.

In the third step, heat treatment is preferably carried out at 120° C.-300° C. The $FeCl_3$ intercalates into the conductor strand 1. The duration of the heat treatment depends in particular on the thickness of the conductor strand 1 and the diffusion path length for the $FeCl_3$ determined therefrom.

In the fourth step, a treatment with the fluorinating agent is carried out.

This can be a perfluorinated or fluorinated olefin, such as in particular hexafluorobutene and hexafluoropropene, a hydrofluorocarbon (CFC) such as in particular trichlorofluoromethane $CFCl_3$ (boiling point 23.7° C.) or dichlorofluoromethane $CF_2Cl_2$, a hydrofluorocarbon (CHF), such as in particular perfluorohexane, pentafluorobutane, or pentafluoropropane, or another suitable fluorine composite, such as $XeF_2$ or $F_2$.

In the fourth step, amorphous $FeF_3$ is produced in situ in the composite conductor by fluorinating $FeCl_3$ intercalated in the conductor strand 1 with the fluorinating agent. In particular, this is done by hydrofluoric acid, as illustrated by way of example in the following reaction in order to convert iron chloride and hydrofluoric acid into iron fluoride and hydrochloric acid:

$$FeCl_{3(s)} + 3HF_{(g)} \rightarrow FeF_{3(s)} + 3HCl_{(g)}$$

Alternatively, fluorine can also be used as the fluorinating agent (conversion of iron chloride and fluorine into iron fluoride and chlorine), leaving only half the gas relative to $FeCl_3$:

$$2FeCl_{3(s)} + 3F_{2(g)} \rightarrow 2FeF_{3(s)} + 3Cl_{2(g)}$$

Even more advantageous is fluorination with trichlorofluoromethane ($CFCl_3$) and dichlorodifluoromethane ($CF_2Cl_2$), because this does not produce any gases; rather, with tetrachloromethane ($CCl_4$), a liquid is produced that can be removed from the conductor by diffusion without expansion. This is shown by way of example in the fluorination with $CF_2Cl_2$ in the following reaction for the conversion of iron chloride and dichlorofluoromethane into iron fluoride and tetrachloromethane:

$$2FeCl_{3(s)} + 3CF_2Cl_{2(g)} \rightarrow 2FeF_{3(s)} + 3CCl_{4(l)}$$

The fluorination with trichlorofluoromethane ($CFCl_3$) can occur, for example, by dipping the composite conductor into $CFCl_3$. The highly exothermic fluorination is carried out according to the following reaction of iron chloride and trichlorofluoromethane into iron fluoride and tetrachloromethane, in particular under moisture exclusion:

$$FeCl_{3(s)} + 3CFCl_{3(l)} \rightarrow FeF_{3(s)} + 3CCl_{4(l)}$$

The composite conductor can thereafter be evacuated at 65° C., for example, in order to remove traces of intercalated tetrachloromethane (boiling point 76.7° C.) from the composite conductor, if necessary, which was not already diffused out of the composite conductor when it was submerged in trichloromethane.

The fluorination of the FeCl$_3$ is highly exothermic and can therefore occur at room temperature. Due to these very mild conditions during fluorination, the formed FeF$_3$ cannot crystallize and thus remains intercalated according to the invention amorphously and finely distributed, particularly advantageously monomolecularly, in the conductor strand 1. This allows a high electrical conductivity of the carbon conductor 3 to be achieved.

In the second step, instead of the iron(III) chloride FeCl$_3$, iron(II) chloride (FeCl$_2$) and chlorine, e.g. in the form of gold chloride, can be introduced into the reactor volume 5. FeCl$_3$ is formed by the conversion of iron(II) chloride and gold chloride into iron(III) chloride and gold according to the following reaction:

$$3FeCl_{2(s)} + AuCl_{3(s)} \rightarrow 3FeCl_{3(s)} + Au_{(s)}$$

This iron(III) chloride then intercalates into the carbon conductor in the third step.

Use of Magnesium Chloride, Magnesium Bromide, or Magnesium Iodide

In this embodiment example, in the fourth step, amorphous magnesium fluoride MgF$_2$ is produced in situ in the composite conductor.

For this purpose, magnesium chloride (MgCl$_2$), magnesium bromide (MgBr$_2$), or magnesium iodide (MgI$_2$) is intercalated into the composite conductor in the third step. Subsequently, in the fourth step, magnesium chloride (MgCl$_2$), magnesium bromide (MgBr$_2$), or magnesium iodide (MgI$_2$) is fluorinated by the fluorinating agent, as shown in the following reaction, by way of example for magnesium chloride and with fluorine as the fluorinating agent.

$$MgCl_2 + F_2 \rightarrow MgF_2 + Cl_2$$

Magnesium chloride (MgCl$_2$), magnesium bromide (MgBr$_2$), or magnesium iodide (MgI$_2$) intercalate very easily into conductor compounds with carbon conductors, because their melting temperatures at 712° C. (MgCl$_2$) or 711° C. (MgBr$_2$) or 637° C. (MgI$_2$) are very much lower compared to the sublimation temperature of MgF$_2$ at approximately 1256° C. In addition, in particular with chlorine, intercalation into the composite conductor is enabled at temperatures below the melting temperature of the metal halides. A further advantage is that, in the composite conductor, the in situ conversion of magnesium chloride (MgCl$_2$), magnesium bromide (MgBr$_2$), or magnesium iodide (MgI$_2$) into MgF$_2$ can be carried out by means of the fluorinating agent at room temperature. This results in amorphous MgF$_2$, which is a strong Lewis acid. A further advantage is that the doping with MgF$_2$ is in particular stable up to at least 350° C. and is insensitive to moisture.

The acidity of MgF$_2$ can be increased to the strength of antimony fluoride (SbF$_5$) and arsenic fluoride (AsF$_3$) by doping the MgF$_2$ with a fluoride of the formula MF$_3$. According to the present invention, this is implemented in that, in addition to the magnesium halide, at least one further halide of the formula MX$_3$ (wherein M stands for a metal in the oxidation stage +3, such as iron (Fe), aluminum (Al), vanadium (V), chromium (Cr), indium (In), and gallium (Ga), and wherein X stands for chlorine, bromine and/or iodine) is intercalated into the composite conductor and, in the step of fluorination, is likewise converted into a fluoride, for example for magnesium chloride according to the reaction:

$$15MgCl_2 + VCl_3 + 2AlCl_3 + FeCl_3 + 21F_2 \rightarrow 15MgF_2 + VF_3 + 2AlF_3 + FeF_3 + 21Cl_2$$

Third Embodiment: Use of an Organoalkali Metal and Subsequent In Situ Conversion into an Alkali Metal Hydride In the third embodiment, the intercalating substance is an organoalkali metal, for example a sodium organyl, in particular sodium naphthalide (C$_{10}$H$_8$Na), n-amyl sodium (C$_5$H$_{11}$Na), or benzyl sodium (C$_7$H$_7$Na). Alternatively, a potassium organyl, in particular benzyl potassium (C$_7$H$_7$K) or methyl potassium (CH$_3$K), or a lithium organyl, in particular benzyl lithium (C$_7$H$_7$Li), n-hexyl lithium (C$_6$H$_{13}$Li), n-butyl lithium (C$_4$H$_9$Li), and phenyl lithium (C$_6$H$_5$Li), can be provided.

In the second step, the conductor strand 1 and the organoalkali metal dissolved in a solvent are introduced into the reactor volume 5. The conductor strand 1 is submerged into the solvent.

In the third step, the conductor strand 1 and the organoalkali metal dissolved in the solvent are thermally treated at mild temperatures from room temperature to 200° C., whereby the organoalkali metal intercalates into the carbon conductor of the conductor strand.

In the fourth step, analogously to the second embodiment, it is provided that the organoalkali metal present in the carbon conductor material is converted in situ into alkali metal hydride, for example lithium hydride (LiH), sodium hydride (NaH), or potassium hydride (KH). This is done, by contrast to the second embodiment, in that the conductor strand 1 is thermally treated in a hydrogen atmosphere, for example at a temperature of 50° C.-250° C.

After the production of the conductor strand according to any one of the three embodiments, it can be provided as the fifth step to intercalate a hydrophobic substance into the material of the carbon conductor or the conductor strand 1, for example in a gas phase or liquid phase. For example, the hydrophobic substance can be an aliphate, an alkane such as in particular undecan, perfluorotripentylamine, perfluoroperhydrofluorene, perfluoroperhydrophenanthrene, or polysiloxane, such as in particular polymethylsiloxane.

Furthermore, after the production of the carbon conductor(s) or the conductor strand according to any one of the three embodiments, it can be provided to compress the conductor strand 1.

The invention claimed is:

1. A method for producing an electrically conductive strand, the method comprising:
   a) producing or providing a conductor strand as an intermediate product comprising at least one carbon conductor, which comprises one or more of graphite, pyrolytic graphite, graphene, and carbon nanotubes,
   b) introducing the conductor strand and an intercalating substance into a gas phase of a reactor volume, the intercalating substance being suitable for intercalation into a material of the at least one carbon conductor, and
   c) carrying out a thermal treatment of the conductor strand, in which the reactor volume is brought to a process temperature to perform an intercalation, in which atoms or molecules of the intercalating substance are embedded in a material of the at least one carbon conductor,
   wherein the process temperature oscillates around a sublimation temperature of the intercalating substance with a range of variation of at least ±20° C.

2. The method according to claim 1, wherein the intercalating substance is a metal fluoride selected from the group consisting of an aluminum fluoride ($AlF_3$), zirconium fluoride ($ZrF_4$), iron fluoride ($FeF_3$), and magnesium fluoride ($MgF_2$).

3. The method according to claim 1, wherein the intercalating substance is a metal chloride, a metal bromide, or a metal iodide, wherein the metal of the metal chloride, metal bromide, or metal iodide is selected from one of the groups 2, 4, 5, 6, 8, 10, 11, 12, or 13 of the periodic table.

4. The method according to claim 1, wherein the method in step b) comprises:
adding gaseous fluorine to the gas phase of the reactor volume.

5. The method according to claim 1, wherein the method in step b) comprises:
adding chlorine in case of a metal chloride as the intercalating substance,
adding bromine in case of a metal bromide as the intercalating substance, or
adding iodine in case of a metal iodide as the intercalating substance.

6. The method according to claim 5, wherein the method additionally comprises:
converting the metal chloride, the metal bromide, or the metal iodide present in the material of the at least one carbon conductor into a corresponding metal fluoride by treating the conductor strand with a fluorinating agent, wherein the treating with the fluorinating agent is carried out at a temperature of less than 200° C.

7. The method according to claim 1, wherein the method additionally comprises:
intercalating a hydrophobic substance into the material of the at least one carbon conductor.

8. The method according to claim 1, wherein the method additionally comprises:
compressing the conductor strand.

9. The method of claim 1, wherein the process temperature oscillates around the sublimation temperature with a range of variation smaller than ±40° C.

10. A method for producing an electrically conductive strand, the method comprising:
producing or providing a conductor strand as an intermediate product comprising at least one carbon conductor, which comprises one or more of graphite, pyrolytic graphite, graphene, and carbon nanotubes;
introducing the conductor strand and an intercalating substance into a gas phase or a liquid phase of a reactor volume, the intercalating substance being selected from the group consisting of a metal chloride, a metal bromide, and a metal iodide, wherein the metal of the metal chloride, the metal bromide, or metal iodide is selected from one of the groups 2, 4, 5, 6, 8, 10, 11, 12, or 13 of the periodic table;
carrying out a thermal treatment of the conductor strand, in which the reactor volume is brought to a process temperature to perform an intercalation, in which molecules of the intercalating substance are embedded in a material of the at least one carbon conductor; and
converting the metal chloride, the metal bromide, or the metal iodide present in the material of the at least one carbon conductor into a corresponding metal fluoride by treating the conductor strand with a fluorinating agent.

11. The method of claim 10, wherein the treating with the fluorinating agent is carried out at a temperature of less than 200° C.

12. The method of claim 10, wherein the converting comprises:
adding gaseous fluorine to the gas phase in case of intercalation in the gas phase of the reactor volume, or
providing a liquid phase with fluorine ions in case of intercalation in the liquid phase of the reactor volume.

* * * * *